United States Patent [19]

Mitchell

[11] 4,405,146
[45] Sep. 20, 1983

[54] COUPLING FOR AN ARTICULATED VEHICLE OR THE LIKE

[76] Inventor: David C. Mitchell, 20 chemin des Rasses, 1255 Veyrier, Geneva, Switzerland

[21] Appl. No.: 288,415

[22] Filed: Jul. 30, 1981

[30] Foreign Application Priority Data

Oct. 29, 1980 [GB] United Kingdom ............... 8034746

[51] Int. Cl.³ ............................................. B62D 53/06
[52] U.S. Cl. ................................ 280/432; 280/446 R; 280/DIG. 14
[58] Field of Search ............... 280/432, 446 R, 446 A, 280/DIG. 14

[56] References Cited

U.S. PATENT DOCUMENTS

| | | | |
|---|---|---|---|
| 2,976,964 | 3/1961 | Thompson | 280/432 |
| 3,917,314 | 11/1975 | Neal | 280/432 |
| 3,985,369 | 10/1976 | O'Leary | 280/432 |
| 4,281,846 | 8/1981 | Hall | 280/432 |

FOREIGN PATENT DOCUMENTS

| | | | |
|---|---|---|---|
| 2837765 | 3/1980 | Fed. Rep. of Germany | 280/432 |
| 2019332 | 10/1979 | United Kingdom | 280/432 |

*Primary Examiner*—Joseph F. Peters, Jr.
*Assistant Examiner*—Kenneth R. Rice
*Attorney, Agent, or Firm*—Steele, Gould & Fried

[57] ABSTRACT

The coupling is provided with a load bearing plate (6) tiltably mounted on a circular plate (10) supported on the tractor for rotation about a substantially vertical axis (20). The load bearing plate receives, in a slot (7) formed therein, a pair of spaced apart kingpins (1,3) on the underside of the trailer (A) in such manner that the trailer and the two plates are restrained from rotation with respect to each other. A pair of fluid operated rams (29,30) are mounted on the tractor and are arranged to cooperate an opposite sides of said axis (20) with rollers (35,36) carried by the circular plate via a pair of swinging arms (23,24) pivoted on a center shaft at one end and on the ends of the ram piston rods (27,28) near their opposite end. Thus only one ram at a time may become operable to resist rotation of the plates away from an in-line position of the tractor and trailer or to restore this position, to avoid trailer swing or to cure a jacknifing condition, without the piston rods fouling the center shaft.

10 Claims, 7 Drawing Figures

COUPLING FOR AN ARTICULATED VEHICLE OR THE LIKE

BACKGROUND OF THE INVENTION

1. Field of the Invention

This invention relates to couplings of the kind used on articulated vehicles, for connecting the tractor and associated trailer of such vehicles and the like.

2. Prior Art

Couplings of this kind connect the trailer to the tractor by engagement of a kingpin, which depends from the front end of the trailer, in a slot provided in the load bearing plate of a fifth wheel assembly mounted on the tractor, the kingpin being releasably held in the plate and the vertical axis of the kingpin being the axis about which relative angular movement of the tractor and trailer takes place.

Jackknifing is a particular hazard to which vehicles using couplings of the said kind are susceptible. One proposal for overcoming, or at least reducing, the hazard has been to provide a fifth wheel assembly having a load bearing plate rotatably mounted on the tractor and releasably engaged by projecting means on the trailer in such manner that the trailer and the load bearing plate are restrained from rotation with respect to each other, and fitted with braking means or with rams, mounted on the tractor, operable to act upon the load bearing plate to resist rotation of the load bearing plate relative to the tractor.

The use of rams, as opposed to braking means such as a disc and callipers as disclosed in U.S. Pat. No. 3,985,369, restrict the extent to which the load bearing plate may rotate since the ram piston rods soon foul the centre shaft of the load bearing plate.

One proposal for overcoming this problem in a coupling using rams consists, as described in British Application No. A 2,019,332, in providing the load bearing plate with a toothed rim meshing with a toothed segment or a sprocket chain mounted on the tractor, opposite portions of the segment or chain being hinged to the ends of a pair of rams (in the case of the segment) or passing around sprockets rotatably mounted on the rams (in the case of the chain), the rams being mounted on the tractor on opposite sides of the plate axis.

These arrangements are expensive and prone to breakage.

SUMMARY OF THE INVENTION

An object of the invention is to provide an arrangement which is simpler, sturdier and more direct while still allowing substantially equivalent freedom of rotation of the load bearing plate.

An apparatus according to this invention for controlling rotational movements about a substantially vertical axis of a coupling between a tractor part and a trailer part of an articulated vehicle, comprises: a pair of fluid operated rams positionably fixable relative to one of said tractor and trailer parts; a first pair of abutments positionably fixable relative to the other of said tractor and trailer parts on opposite sides of said axis; and, a pivotal arm at one end of each of the rams, extending generally radially of and towards a shaft coaxial with said axis and pivotally mounted thereon, said arms forming a second pair of abutments on opposite sides of said axis which cooperate in freely disengagable manner with said first pair of abutments, whereby only one ram at a time is operable to resist rotation between the tractor and trailer parts away from a neutral position corresponding to an aligned position of the tractor and trailer parts and operable to return the tractor and trailer parts back to said neutral position, the other ram remaining during that time in a fully extended position.

An apparatus according to this invention for providing a fifth wheel assembly for use in a coupling between a tractor part and a trailer part of an articulated vehicle, comprises: load bearing means adapted to be mounted on the tractor part for rotation about a substantially vertical axis and having a first pair of abutments on opposite sides of said axis; engaging means adapted to be mounted on the trailer part engageable with the load bearing means to restrain the trailer part and the load bearing means from rotation with respect to each other; a pair of fluid operated rams adapted to be mounted on the tractor part; and, a pivotal arm at one end of each of the rams, extending generally radially of and towards a shaft coaxial with said axis and pivotally mounted thereon, said arms forming a second pair of abutments on opposite sides of said vertical axis which cooperate in freely disengagable manner with said first pair of abutments, one ram at a time being thereby operable to resist rotation of the load bearing means relative to the tractor part away from a neutral position corresponding to an aligned position of the tractor and trailer parts and operable to return the load bearing means back to said neutral position, the other ram remaining during that time in a fully extended position.

In British Application No. A 2,019,332, the cylinders of the rams are interconnected so that fluid being forced out of one cylinder can pass into the other. By providing the interconnecting conduit with a valve which can be progressively closed under the action of a pump, operable by the vehicle brake control, the flow rate of the fluid can be controlled so that rotation of the load bearing plate relative to the tractor may be resisted whenever braking pressure is applied by the driver. The hydraulic arrangement disclosed in British Application No. A 2,019,322 thus can only act as a braking means.

A further object of the invention is to provide control means or a fifth wheel assembly which are not only able to perform the function of braking means but can also be made to exert forces to keep the tractor and trailer parts in line and even to correct the lack of such alignment, at least to some extent.

Thus according to a preferred form of embodiment of the control means or of the fifth wheel assembly according to the invention, the rams are associated with valve means operable firstly to restrain the outflow of fluid from a fluid-containing portion of one or other ram when rotation occurs about said axis away from said neutral position whereby said ram may resist such rotation, and operable secondly to allow a return flow of fluid into said fluid-containing portion when rotation occurs about said axis towards said neutral position, and the valve means are series-mounted with pump means operable to subject said return flow to pressure whereby said ram may urge rotation back to said neutral position.

Thus besides having the potential of curing a jackknifing condition, the control means or the fifth wheel assembly according to the above preferred form of embodiment of the invention also have the potential of curing trailer swing which represents another hazard of articulated vehicles and which is believed to account for a substantial proportion of all semi-trailer accidents.

In practice the valve means and the pump means are normally operatively connected to governing means, which governing means include detector means, e.g. sensors, adapted to be mounted on various parts of the vehicle and to feed information about certain operational parameters of the vehicle to a microprocessor adapted to control the operation of the valve means and of the pump means in dependence on the information it receives.

Figure 1:
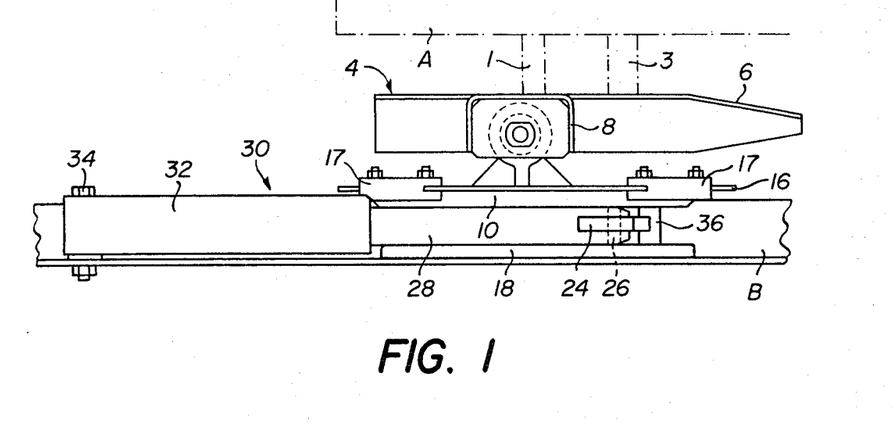
FIG. 1 is a side view of a first coupling in accordance with the invention.
Figure 2:
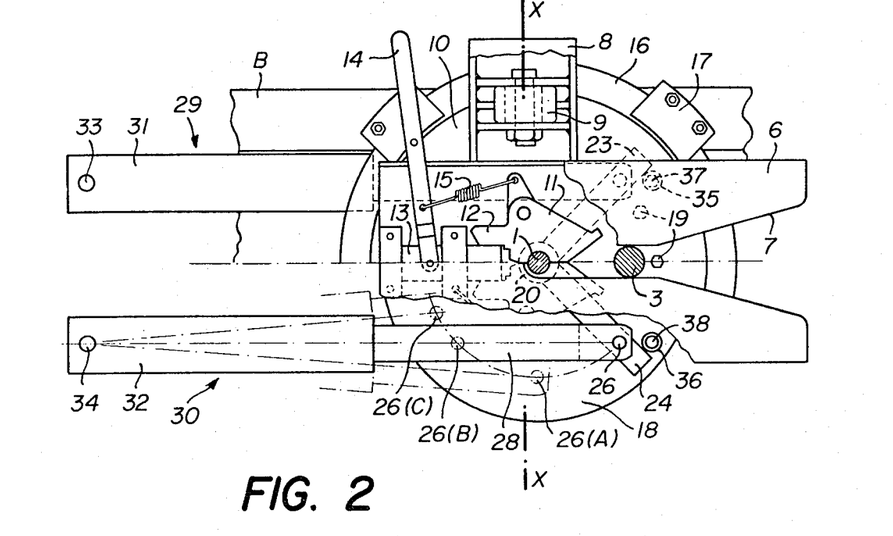
FIG. 2 is a partly sectioned plan view of the coupling shown in FIG. 1.
Figure 3:
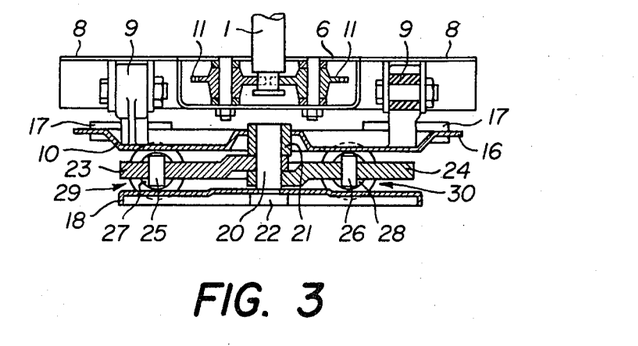
FIG. 3 is a transverse sectional view of the coupling shown in FIG. 2, but with each half showing a different operative state.

The coupling shown in FIGS. 1 to 3 includes a main kingpin 1 of conventional form which is mounted on the underside of the forward end of a trailer A of an articulated, or like vehicle. As is usual the main kingpin is on the plane of symmetry of the trailer. Spaced behind the main kingpin 1, also on the plane of symmetry, is a similar, secondary, kingpin 3 which is mounted on the underside of the trailer, possibly removably.

The coupling also includes a fifth wheel assembly 4 mounted on a tractor B of the vehicle. The fifth wheel assembly 4 comprises an oblong rectangular load bearing plate 6 having a slot 7 extending for more than half of its length along its longitudinal axis from the rear end of the plate. The outer portion of the slot opening to the rear end of the plate is flared whilst the inner end portion is parallel sided and of a width complementary to the diameter of the kingpins 1 and 3.

The main kingpin 1 engages in and projects below the inner end of the slot 7. The secondary kingpin 3 engages the parallel sides of the inner end portion of the slot close to the junction of that portion with the flared outer portion. At both sides of the plate 6 opposite the inner end of the slot there are outriggers 8 which are pivoted about a common horizontal axis to gudgeon members 9 fixed on a dished circular plate 10. The horizontal axis forms a hinge axis X for the load bearing plate, which axis extends normal to the longitudinal axis of the plate and tangentially to the inner, rounded, end of the slot 7.

Underneath the load bearing plate 6 are pivotally mounted a pair of springloaded jaws 11 of conventional form for gripping the bottom end of the main kingpin 11 to retain that kingpin in engagement with the plate. The jaws have opposed tail portions 12 between which a sliding detent 13 engages to lock the jaws in the gripping position. A lever 14 connected to the detent and to one of the jaws 11 by a helical tension spring 15 is operable to withdraw the detent 13 and open the jaws against the spring force in order to release the kingpin.

The circular plate 10 is of a large diameter and defines at its periphery an annular flange 16 having a diameter of about 80 cm. At angularly spaced positions the flange 16 is engaged by channel-section or split bearings 17 which straddle the flange and are fixed to the tractor as by bolts. By their engagement with the flange, the bearings 17 support the circular plate 10 so that it can rotate about its vertical axis on the tractor while being prevented from axial movement relative to the tractor. Since the circular plate 10 is rotatable the load bearing plate 6 is also rotatable.

A second dished circular plate, 18, is disposed below the plate 10, the two being held apart and secured to each other as by spacer bolts 19. At the center of the plates 10 and 18 is mounted a vertical shaft 20 which is held in place by locked rings 21 and 22 for rotation with the plates 10 and 18 and secured against axial movement. The shaft 20 carries a pair of swinging arms 23 and 24 whose opposite ends are pivoted by pins 25 and 26 in the forked free ends of the pistons rods 27 and 28 of a pair of rams 29 and 30 having their cylinders 31 and 32 pivoted by upstanding pins 33 and 34 on the tractor. The spacing between the plates 10 and 18 is such as to enable the piston rods 27 and 28 to be supported and guided by the plates.

Between the plates 10 and 18 are provided a pair of rollers 35 and 36 mounted on pins or bolts 37 and 38. The rollers 35 and 36 are disposed close to the periphery of the dished portions of plates 10 and 18 so that they may engage with the free end portions of the swinging arms 23 and 24 in the region of the pins 25 and 26, at much the same radial distance from the central axis of rotation as the outriggers 8 and close to the bearings 17, to keep stresses low.

In the position of rest of the fifth wheel assembly, i.e. the position shown in full lines in the lower half of FIG. 2 (see also FIG. 6), the arms 23 and 24, the rollers 35 and 36 and the rams 29 and 30 are symmetrically disposed on opposite sides of the plane of symmetry of the tractor, with the rams 29 and 30 in parallel relationship, the arms 23 and 24 at right angles to each other forming a V pointing towards the rams, and the rollers 35 and 36 in engagement with the arms 23 and 24 on the inside of the V.

Figure 7:
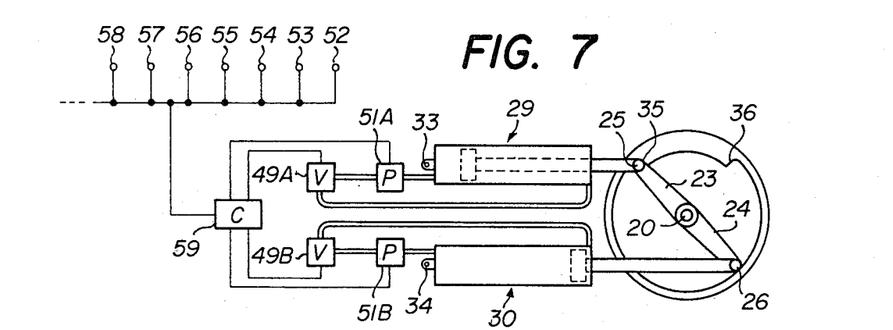

The illustrated arrangement is designed to allow the plates 6, 10 and 18 to rotate up to about 110°, as illustrated by the position C of pin 26, although it is preferred to keep to within 90°, i.e. the position B of the pin 26 (or FIG. 7). Positions A and C of the pin 26 show the extreme angular positions that the rams can occupy during operation.

The trailer is connected to the tractor by engaging the main kingpin 1 in the slot 7 of the load bearing plate 6 in the usual manner. When the main kingpin is fully engaged in the slot the secondary pin 3 also engages in the slot and prevents the main kingpin from rotating relative to the load bearing plate. Accordingly the load bearing plate is restrained from rotating relative to the trailer as well, and so too is the circular plate 10, which is permitted by the bearings 17 to rotate relative to the tractor when turning movement occurs between the tractor and the trailer. With the kingpins both engaged in the slot, the load bearing plate 6 is retained in an angular position relative to the trailer in which the hinge axis X is normal to the plane of symmetry of the trailer. The hinged connection of the load bearing plate 6 to the circular plate 10 allows vertical flexing such as pitching motion between the tractor and trailer. Since the hinge axis X turns with the plates 6 and 10 and is always normal to the longitudinal axis of the trailer any vertical flexing is accommodated whatever the angular position of the trailer with respect to the tractor.

Figure 4:
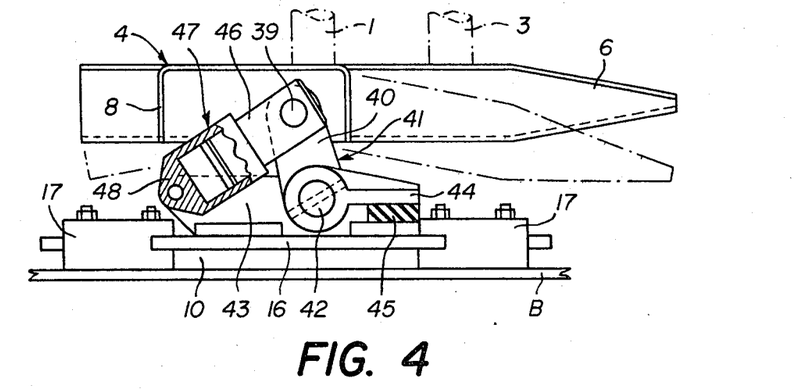
FIGS. 4 and 5 are respectively a partly sectioned side view and a plan view of a second coupling in accordance with the invention.
Figure 5:
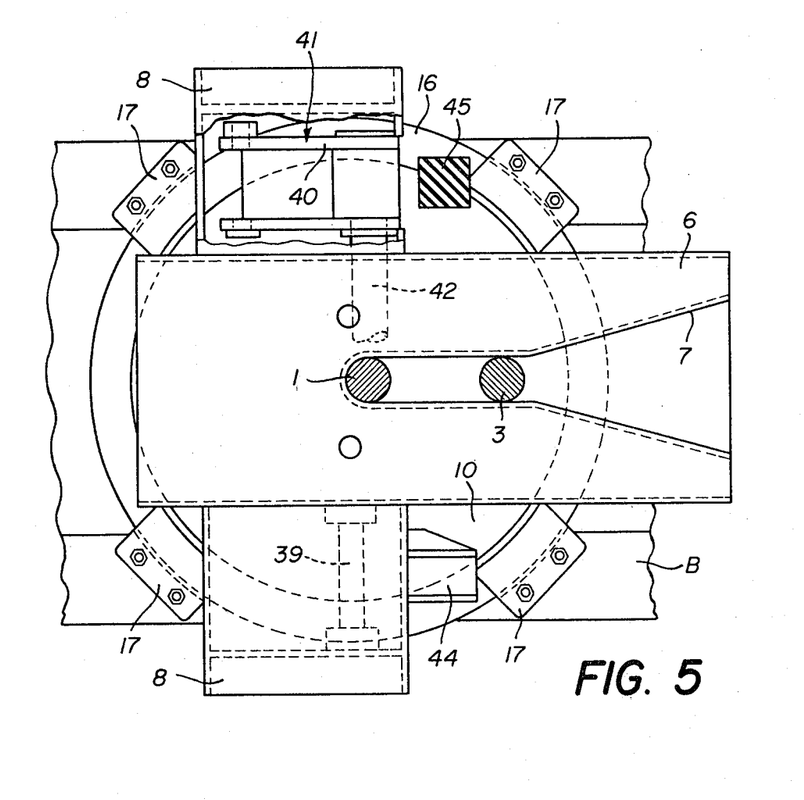

In the coupling shown in FIGS. 4 and 5 of the drawings parts similar to those in the embodiment described are identified by the same reference numerals. The kingpins 1 and 2, the circular plates 10 and 18, the bearings 17 and the rams 29 and 30 are unchanged. The load bearing plate 6 is substantially similar to that previously described but it is mounted in a different manner on the plate 10. The load bearing plate 6 in this instance is pivoted at its outriggers 8 by pivot pins 39 to the upper outer ends of substantially vertically extending limbs 40 of two crank members 41. The crank members are fixed at their fulcrums, in the same angular position, on a common shaft 42 rotatably mounted in bearings 43 fixed on top of the plate 10. The shaft 42 extends horizontally at right angles to the longitudinal axis of the load bearing plate and is slightly rearwards of the vertical axis of the plates 10 and 18 and of the shaft 20. The other limbs 44 of the crank members extend rearwards. Normally they extend substantially horizontally and in that position bear down on buffer pads 45 of rubber or other suitable resilient material mountd on the plate 10. Also pivoted to the load bearing plate by the pivot pins 39 are the pistons 46 of two rams 47 having their cylinders 48 pivoted to the bearings 43 in front of the shaft 42. The rams 47 have fluid supplied to them for instance from the road wheel braking system of the vehicle. Pressure in the rams 47 is preset to restrain the crank members 41 from rotating forwards and lifting the limbs 44 from their normally substantially horizontal position, until a predetermined thrust is exerted on the crank members via pins 39 by the trailer through the main kingpin 1 and the load bearing plate 6. When the pistons 46 are forced into the cylinders 48 the resultant increased fluid pressure generates a signal which is fed into a microprocessor which controls the operation of the rams 29 and 30 as will be explained further on. When the thrust is subsequently removed the crank members return to their normal angular positions, which relieves the pressure in the rams 47, causing the signal to change.

The pivot pins 39 provide a hinge axis about which the load bearing plate 6 can move angularly relative to the circular plate 10 to accommodate vertical flexing or pitching motion between the tractor and trailer. Under normal travelling conditions turning and flexing motion does not cause any angular movement of the crank members. Such movement is restrained by the rams 47 and by the buffer pads 45.

Figure 6:
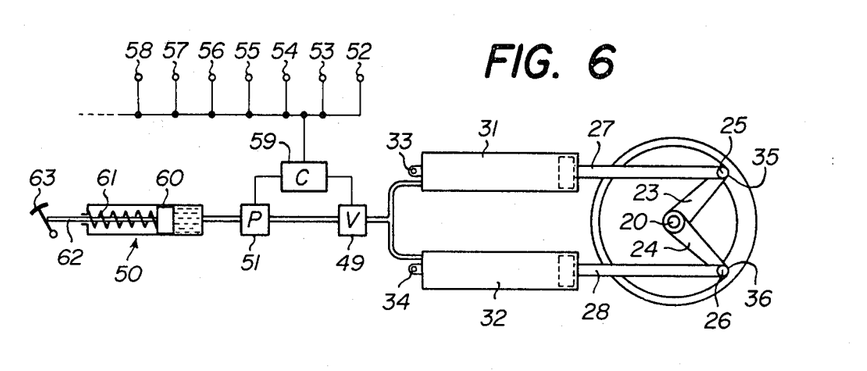
FIGS. 6 and 7 are diagrams illustrating the operation of the couplings shown in FIGS. 1 to 5 and showing two possible forms of a hydraulic and control system cooperating therewith.

FIG. 6 illustrates the position occupied by the main parts of the fifth wheel assemblies described above when the trailer and tractor are in a straight line. The rollers 35 and 36 are shown as abutment-forming shoulders at opposite ends of a segment solid with the plates 10 and 18 and extending between and preferably in contact with the arms 23 and 24 in their position of rest in the unrotated condition or neutral position of the plates 10 and 18.

When the tractor turns to the right, the plates 6, 10 and 18 together remain in line with the trailer, and turn in an anti-clockwise direction relative to the tractor, as shown in FIG. 7, and the abutment 35 acts upon the arm 23 to force the piston rod 27 into the cylinder 31. In so doing the abutment 36 moves away from the arm 24 and leaves the piston rod 28 unmoved in its fully extended position. When the tractor turns to the left, the opposite occurs, i.e. the plates 6, 10 and 18 together turn in a clockwise direction relative to the tractor, and the abutment 36 acts upon the arm 24 to force the piston rod 28 into the cylinder 32; the abutment 35 moves away from the arm 23 and leaves the piston rod 27 unmoved in its fully extended position. Thus the mechanism will allow the plates to drive only one ram at a time and to drive each ram in one direction only, without the piston rods fouling the centre shaft 20.

If rotation occurs under normal conditions, e.g. as a result of ordinary steering of the tractor, a valve 49 in the case of the hydraulic system of FIG. 6 allows fluid to flow freely to a variable volume reservoir 50 through a, preferably centrifugal, pump 51. But if rotation of the plates occurs under abnormal conditions, e.g. without any steering movements in the tractor, such being indicative of a tendency towards jackknifing or of trailer swing, the valve 49 is caused to restrain, i.e. restrict and/or stop, the flow of fluid therethrough so as to restrain the ram 29 or 30 hence restrain further rotation of the plates 6, 10 and 18 on the tractor. The rams 29 and 30 thus act in those circumstances as brakes.

Jackknifing can be caused by a variety of factors, e.g. an oblique thrust from the trailer to the tractor when the tractor and trailer are not in full alignment, as when cornering and when braking or other forces tend to cause the trailer to overrun the tractor, or when the back wheels of the tractor or the wheels of the trailer lock tending to cause sideways motion of those wheels.

To detect the various factors that can lead to jackknifing, sensors are mounted in various parts of the vehicle as required, e.g. an angular sensor 52 associated with, say, the plate 18 or the shaft 20 for detecting clockwise or anticlockwise rotation of the plates 6, 10 and 18 relative to the tractor and for measuring the extent and speed of such rotation, a pressure responsive sensor 53 for detecting horizontal thrust of the trailer across the load bearing plate 6, a sensor 54 for detecting a locking or near locking condition of the trailer wheels, a sensor 55 for detecting a locking or near locking condition of the tractor rear wheels, sensors 56 and 57 for detecting a fully extended condition of both piston rods 27 and 28 simultaneously, and an angular sensor 58 on the steering column for detecting steering of the tractor front wheels to the left and to the right and for measuring the extent and speed of rotation of the column.

Sensors for use at 52, 54, 55 and 58 are of known construction and may be found on the market. The sensor 53 could consist of the mechanism 39 to 47 described with reference to FIGS. 4 and 5, and the sensors 56 and 57 could comprise microswitches mounted on the arms 23 and 24 and cooperating with the abutments 35 and 36.

For instance, when a microprocessor 59 receives signals from the sensors 52 and 58 during travel of the vehicle, it processes these signals and if it finds (a) that the steered wheels and the plates 6, 10 and 18 are turning in compatible directions, e.g. the wheels to the left and the plates clockwise relative to the tractor, and (b) that the speed of rotation of the steering column and of the plates are commensurate, the microprocessor 59 issues signals to the valve 49 to open fully or to remain so and to the pump 50 to be inactive. Under these conditions, fluid will flow freely through the valve 49 and the pump 51 from the ram 29 or 30, when the piston rod of either is being driven in, into the reservoir 50, a piston 60 in the reservoir being in so doing forced back against the action of a compression spring 61 coiled round a piston rod 62, and from the reservoir 50 under the action of the spring 61 back to the ram 29 or 30 to restore a piston rod that has been driven in to its fully extended condition.

But if the microprocessor 59 finds that the steered wheels and the plates 6, 10 and 18 are turning in incompatible directions and/or the speeds of rotation of the steering column and of the plates are not commensurate, e.g. the plates are rotating too quickly relative to the speed of rotation of the steering column (as with sideways skidding of the tractor rear wheels), such being indicative of a jackknifing condition, the microprocessor firstly issues signals to the valve 49 for it to stop the flow therethrough of fluid from the ram being actuated and hence to stop the jackknifing motion that has been detected, and then, on receipt of signals from the sensor 52 that rotation of the plates 6, 10 and 18 has ceased, issues signals to the pump 51 to force fluid from the reservoir 50 back to the ram that has been actuated and virtually simultaneously issues signals to the valve 49 to open, the pressure generated by the pump being such as to overcome the force exerted on the ram's piston from the plates 6, 10 and 18 to restore the piston to its fully extended position and hence return the vehicle into an aligned condition. On receiving signals from the sensors 56 and 57 that the plates 6, 10 and 18 are in their normal "in line" condition and on being satisfied by the signals received from the other sensors that conditions are otherwise normal, the microprocessor 59 issues a signal to deactivate the pump 51, thus restoring normal driving conditions.

In another instance, the microprocessor 59 may receive signals from the sensor 52 indicating that the plates 6, 10 and 18 have rotated or are rotating and signals from the sensor 58 indicating that the steering column is not being rotated. Such a situation arises with trailer swing or with snaking.

With trailer swing the trailer follows a path oblique to that of the tractor, as is most likely to happen when the trailer is high-bodied and unladen and subject to a strong side wind, or when a trailer is being pulled and the road slopes steeply from the center of the road, i.e. when there is a very pronounced camber or when the articulated combination takes a turn at high speed and centrifugal forces tend to throw the back of the trailer out from the curve of the trajectory. In snaking, the trailer oscillates from side to side and follows a sinuous course behind the tractor.

In such a situation, the plates 6, 10 and 18 turn clockwise or anticlockwise in the case of trailer swing, causing the piston of ram 29 or the piston of ram 30 to be driven in, or turn alternatively clockwise and anticlockwise in the case of snaking, causing first the piston of ram 29 and then the piston of ram 30 to be driven in.

To redress the situation, the microprocessor acts much as in the potential jackknifing situation described above, i.e. it causes first the valve 49 to reduce or stop the flow of fluid to the reservoir 50 from either ram and then activates the pump 51 and opens the valve 49 to return the ram piston rods 27 and 28 to their fully extended position.

In a further instance, the microprocessor may receive signals from the sensor 53 indicating that the main kingpin of the trailer is exerting excess thrust on the plates 6, e.g. when the tractor is braking, which in itself may be normal. But if the microprocessor also receives signals from the sensor 52 indicating that the plates 6, 10 and 18 are rotating, with or without rotation of the steering column as would be indicated by the sensor 58, signals would then be issued to the valve 49 and to the pump 51 first to stop rotation of the plates and then to bring the tractor and trailer back into alignment.

In yet another instance, the microprocessor 59 may receive signals from the sensors 54 and/or 55 indicating that the associated wheels are locking or about to lock. The microprocessor would then issue signals to close the valve 49 to block the rams 29 and 30. No signal would need to be issued to the pump 51 if no rotation of the plates 6, 10 and 18 has occurred.

The above instances are given purely by way of example to illustrate the operation and advantages of the described fifth wheel assemblies, and are not exhaustive.

To guard against failure to the control means 52 to 59 of the hydraulic and control system shown in FIG. 6, driver operable means, e.g. a pedal 63 on the piston rod 62 or a switch in the driver's cabin for activating the pump 51, may be provided for safety. Also, to guard against the hydraulic and control system becoming operative during, say maneuvering of the vehicle when it is expected to carry out unusual operations, means are preferably provided for rendering the control means 52 to 59 ineffective, e.g. a switch in the driver's cabin, to prevent the piston rods 27 and 28 from being blocked or from being forced out to their fully extended position by the pump 51.

The sensor 52 could possibly be a fluid flow meter disposed in the fluid duct between the valve 49 and the branches leading to the cylinders 31 and 32. If the sensor 52 is as described earlier, the functions of the sensors 56 and 57 could possibly be performed by the sensor 52 (the 0° position).

For the sensor 53 to operate optimally, its sensitivity would need to be varied with trailer load and vehicle speed and such variation could for instance be performed by the microprocessor 59 on being supplied with signals from load sensors provided in the region of the main kingpin 1 and of the trailer axle and signals from the vehicle speedometer.

Instead of the valve 49 having to be opened under the control of the microprocessor 59 each time the pump 51 is activated, the valve could include a valve member that automatically lifts off a seat when fluid is made to flow from the reservoir 50 towards the rams 29 and 30.

FIG. 7 shows a modified form of hydraulic and control system for the fifth wheel assemblies described and illustrated.

In this modified system there is no reservoir 50, the rams 29 and 30 are provided with separate valves 49A and 49B and with separate pumps 51A and 51B respectively, the fluid issuing from the left-hand end of the cylinder 31 or 32, when the associated piston rod 27 or 28 is being driven in, is reintroduced into the cylinder as its other end, the microprocessor 59 is programmed to act selectively on the valve and pump of one or other ram, in dependence on the information it receives from the sensors 52 to 58, which sensors may be the same as before, and compression springs (not shown) are provided on the left-hand side of the pistons inside the cylinders 31 and 32 to urge the rods 27 and 28 back to their fully extended position when no longer being acted on by the abutments 35 and 36.

Whilst the system described with reference to FIG. 6 may be linked with the braking system of the tractor, the system described with reference to FIG. 7 is necessarily autonomous.

Tractors having fifth wheel assemblies such as described and illustrated may still be connected to trailers fitted with a standard single kingpin, i.e. not fitted with a secondary kingpin or other device for restraining rotation between the load bearing plate and the trailer.

To enable a trailer having two kingpins as described and illustrated to be connected to a tractor having an ordinary fifth wheel assembly, the secondary kingpin is removably mounted on the trailer or, preferably, is mounted on the underside of the trailer at a distance such from the main kingpin that it will not engage or interfere with any part, e.g. the load bearing plate, of an ordinary fifth wheel assembly.

It will be appreciated that the braking and restoring efforts from the fifth wheel assembly to the trailer are transmitted not through torsional strength of the main kingpin, but as a shear load on the secondary kingpin. The secondary kingpin may be of larger diameter than the main kingpin if necessary to take the shear load.

Instead of the fifth wheel assemblies shown in FIGS. 1 to 5 being mounted directly on the tractor, these assemblies could be mounted on a frame or other support which is subsequently mounted as a unit on the tractor.

In a modified arrangement of the coupling, the load bearing plate 6 could be dispensed with, with the underside of the trailer being releasably, as by clamps, or permanently connected to the transverse axis on which the plate 6 was mounted.

In another arrangement where the tractor and trailer are permanently connected for rotation about a substantially vertical axis, the piston rods cooperate with abutments provided directly on the underside of the trailer, in the same manner as before.

I claim:

1. An apparatus for controlling rotational movements about a substantially vertical axis of a coupling between a tractor part and a trailer part of an articulated vehicle, comprising:
   a pair of fluid operated rams positionally fixable relative to one of said tractor and trailer parts;
   a first pair of abutments positionally fixable relative to the other of said tractor and trailer parts on opposite sides of said axis; and
   a pivotal arm at one end of each of the rams, extending generally radially of and towards a shaft coaxial with said axis and pivotably mounted thereon, said arms forming a second pair of abutments on opposite sides of said axis which cooperate in freely disengagable manner with said first pair of abutments, whereby only one ram at a time is operable to resist rotation between the tractor and trailer parts away from a neutral position corresponding to an aligned position of the tractor and trailer parts and operable to return the tractor and trailer parts back to said neutral position, the other ram remaining during that time in a fully extended position.

2. An apparatus providing a fifth wheel assembly for use in a coupling between a tractor part and a trailer part of an articulated vehicle, comprising:
   load bearing means adapted to be mounted on the tractor part for rotation about a substantially vertical axis and having a first pair of abutments on opposite sides of said axis;
   engaging means adapted to be mounted on the trailer part and engageable with the load bearing means to restrain the trailer part and the load bearing means from rotation with respect to each other;
   a pair of fluid operated rams adapted to be mounted on the tractor part; and
   a pivotal arm at one end of each of the rams, extending generally radially of and towards a shaft coaxial with said axis and pivotally mounted thereon, said arms forming a second pair of abutments on opposite sides of said vertical axis which cooperate in freely disengagable manner with said first pair of abutments, one ram at a time being thereby operable to resist rotation of the load bearing means relative to the tractor part away from a neutral position corresponding to an aligned position of the tractor and trailer parts and operable to return the load bearing means back to said neutral position, the other ram remaining during that time in a fully extended position.

3. The apparatus of claims 1 or 2, wherein the pivotal arms in said neutral position form a "V" said first pair of abutments are arranged to cooperate with the arms of said "V" on the inside thereof.

4. The apparatus of claim 2, wherein the load bearing means include a pair of spaced apart rotary plates, and said one end of the rams and the pivotal arms are sandwiched between said pair of plates, said arms being arranged to cooperate with a pair of rollers provided between said pair of plates and forming said first pair of abutments.

5. The apparatus of claims 1 or 2, further comprising:
   valve means associated with the rams and operable firstly to restrain the outflow of fluid from a fluid-containing portion of one of said rams when rotation occurs about said axis away from said neutral position whereby said ram may resist such rotation, and operable secondly to allow a return flow of fluid into said fluid-containing portion when rotation occurs about said axis back towards said neutral position; and,
   pump means series-mounted with the valve means and operable to subject said return flow to pressure whereby said ram may urge rotation back to said neutral position.

6. The apparatus of claim 5, wherein the valve means and the pump means are operatively connected to governing means therefor, said governing means including detector means adapted to be mounted on the vehicle and to feed information about operational parameters of the vehicle to a processor adapted to control the operation of the valve means and of the pump means in dependence on the information it receives.

7. The apparatus of claim 2, wherein the load bearing means comprise a load bearing plate which is supported on a rotary plate, said load bearing plate being shiftable relative to the tractor part under thrusts from the trailer part to the tractor part indicative of a jackknifing condition of the tractor and trailer parts, the shifting movement of the load bearing plate producing a control signal for the rams.

8. The apparatus of claim 7, wherein the load bearing plate is supported by crank members pivoted about an axis transverse to the longitudinal axis of the trailer part and rotatable with the load bearing plate, the pivotal axis of the crank members enabling shifting movement of the load bearing plate.

9. An apparatus for controlling rotational movements about a substantially vertical axis of a coupling between a tractor part and a trailer part of an articulated vehicle, comprising:
   a pair of fluid operated rams positionally fixable relative to one of said tractor and trailer parts;

a first pair of abutments positionally fixable relative to the other of said tractor and trailer parts on opposite sides of said axis;

a second pair of abutments on opposite sides of said axis, associated each with one of the rams and co-operating in freely disengagable manner with said first pair of abutments, whereby only one ram at a time is operable to resist rotation between the tractor and trailer parts away from a neutral position corresponding to an aligned position of the tractor and trailer parts and operable to return the tractor and trailer parts back to said neutral position, the other ram remaining during that time in a fully extended position;

valve means associated with the rams and operable firstly to restrain the outflow of fluid from a fluid-containing portion of one of said rams when rotation occurs about said axis away from said neutral position whereby said ram may resist such rotation, and operable secondly to allow a return flow of fluid into said fluid-containing portion when rotation occurs about said axis back towards said neutral position;

pump means series mounted with the valve means and operable to subject said return flow to pressure whereby said ram may urge rotation back to said neutral position; and, governing means operatively connected to the valve means and the pump means, and including detector means, adapted to be mounted on the vehicle and to feed information about operational parameters of the vehicle to a processor adapted to control the operation of the valve means and of the pump means in dependence on the information it receives.

10. An apparatus providing a fifth wheel assembly for use in a coupling between a tractor part and a trailer part of an articulated vehicle, comprising:

load bearing means adapted to be mounted on the tractor part for rotation about a substantially vertical axis and having a first pair of abutments on opposite sides of said axis;

engaging means adapted to be mounted on the trailer part engageable with the load bearing means to restrain the trailer part and the load bearing means from rotation with respect to each other;

a pair of fluid operated rams adapted to be mounted on the tractor part;

a second pair of abutment on opposite sides of said vertical axis associated each with one of the rams and cooperating in freely disengagable manner with said first pair of abutments, one ram at a time being thereby operable to resist rotation of the load bearing means relative to the tractor part away from a neutral position corresponding to an aligned position of the tractor and trailer parts and operable to return the load bearing means back to said neutral position, the other ram remaining during that time in a fully extended position valve means associated with the rams and operable firstly to restrain the outflow of fluid from a fluid-containing portion of one of said rams when rotation occurs about said axis away from said neutral position whereby said ram may resist such rotation, and operable secondly to allow a return flow of fluid into said fluid-containing portion when rotation occurs about said axis back towards said neutral position;

pump means series mounted with the valve means and operable to subject said return flow to pressure whereby said ram may urge rotation back to said neutral position; and, governing means operatively connected to the valve means and the pump means, and including detector means, adapted to be mounted on the vehicle and to feed information about operational parameters of the vehicle to a processor adapted to control the operation of the valve means and of the pump means in dependence on the information it receives.

* * * * *

UNITED STATES PATENT AND TRADEMARK OFFICE
CERTIFICATE OF CORRECTION

PATENT NO. : 4,405,146
DATED : September 20, 1983
INVENTOR(S) : David C. Mitchell It is certified that error appears in the above—identified patent and that said Letters Patent is hereby corrected as shown below:

In column 1, line 8, insert --and the like-- after "vehicles";

column 1, line 9, after "vehicles", "and the like" should be deleted.

column 3, between lines 26 and 27, insert --Detailed Descriptions of the Preferred Embodiments; column 3, line 58, "11" should be --1--.

In column 5, line 6, "2" should be --3--; column 5, line 23, "mounpd" should be --mounted--.

In column 8, line 13, "to" should be --of--.

Signed and Sealed this

Twenty-seventh Day of November 1984

[SEAL]

Attest:

GERALD J. MOSSINGHOFF

Attesting Officer — Commissioner of Patents and Trademarks